(12) United States Patent
Hattori

(10) Patent No.: US 6,413,186 B1
(45) Date of Patent: Jul. 2, 2002

(54) POWER TRAIN SYSTEM FOR A VEHICLE

(75) Inventor: Noboru Hattori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/598,993

(22) Filed: Jun. 22, 2000

(30) Foreign Application Priority Data

Jun. 23, 1999 (JP) .......................................... 11-176657

(51) Int. Cl.[7] .......................... F16H 48/06; F16H 37/08
(52) U.S. Cl. ...................................... 475/221; 475/204
(58) Field of Search ................................ 475/200, 204, 475/206, 221, 225, 230

(56) References Cited

U.S. PATENT DOCUMENTS

| | | | | |
|---|---|---|---|---|
| 2,120,831 A | * | 6/1938 | Cotterman | 475/204 X |
| 3,614,902 A | * | 10/1971 | Candellero | 475/200 X |
| 3,777,837 A | * | 12/1973 | Harper | 180/70 R |
| 4,213,352 A | * | 7/1980 | Crawford | 74/677 |
| 5,041,067 A | * | 8/1991 | Hauser | 475/206 X |
| 5,620,387 A | * | 4/1997 | Janiszewski | 475/207 X |
| 5,833,566 A | * | 11/1998 | Showalter | 475/204 X |
| 5,836,848 A | * | 11/1998 | Janiszewski et al. | 475/204 |
| 6,059,684 A | * | 5/2000 | Sasaki et al. | 475/206 |

FOREIGN PATENT DOCUMENTS

| | | | | |
|---|---|---|---|---|
| FR | 2693529 | * | 1/1994 | 475/200 |
| JP | 403204435 | * | 9/1991 | 475/204 |
| JP | 10-325456 | | 12/1998 | |
| SU | 1699821 | * | 12/1991 | 475/200 |

* cited by examiner

Primary Examiner—Charles A Marmor
Assistant Examiner—Roger Pang
(74) Attorney, Agent, or Firm—Foley & Lardner

(57) ABSTRACT

Provided is a power train system for a vehicle, for transmitting power from a motor to a differential gear unit. The motor and the differential gear unit are disposed so that the output shaft of the motor and an axis of rotation of an output portion of the differential gear unit are parallely offset in the longitudinal direction of the vehicle. The power train system comprises a planetary reduction gear unit connected to the motor to be driven thereby and a parallel reduction gear unit drivingly connecting between the planetary reduction gear unit and the differential gear unit. The planetary reduction gear unit and the parallel reduction gear unit are disposed within a stationary casing. The planetary reduction gear unit includes a sun gear disposed coaxially with and connected to an output shaft of the motor so as to be driven thereby, a ring gear fixedly attached to the casing, at least one pinion gear disposed between the sun gear and the ring gear and a carrier carrying thereon the pinion gear and having an output portion. The parallel reduction gear unit includes a smaller gear and larger gear meshing with each other. The smaller gear has a rotation shaft connected coaxially with the output portion of the carrier. The larger gear is disposed coaxially with an output portion of the differential gear unit. Opposite ends of the rotation shaft of the smaller gear are supported rotatably and directly upon the casing by way of a pair of bearings, respectively.

9 Claims, 3 Drawing Sheets

POWER TRAIN SYSTEM FOR A VEHICLE

BACKGROUND OF THE INVENTION

The present invention relates to a power train system for a vehicle, particularly of the kind having a planetary reduction gear unit and a parallel reduction gear unit and adapted to transmit power from a motor such as an electric motor to the parallel reduction gear by way of the planetary reduction gear unit and then from the parallel reduction gear unit to a differential gear unit which is disposed so that an output shaft of the motor and an axis of rotation of an output portion of the differential gear unit are parallely offset in the longitudinal direction of the vehicle.

A prior art power train system for a vehicle is disclosed by way of example in Japanese Patent Provisional Publication No. 10-325456.

SUMMARY OF THE INVENTION

It was revealed by the applicants that the above described prior art power train system had two problems. A first problem is that a rotation shaft of a smaller gear of a parallel reduction gear unit requires four bearings in order to support the load perpendicular thereto. In this connection, in the above described prior art power train system, a sun gear of a planetary reduction gear unit has a hollow rotation shaft connected at a closed end to a motor. The rotation shaft of the smaller gear has an end portion supported on a stationary casing by way of a bearing and another end portion protruded into the hollow rotation shaft of the sun gear and supported on the inner circumferential surface of the hollow rotation shaft of the sun gear by way of a pair of bearings. The hollow rotation shaft of the sun gear is in turn supported on the casing by way of a bearing. The necessity of a large number of bearings inevitably results in a high cost of the power train system. Further, a friction loss resulting due to a load perpendicular to the rotation shaft of the smaller gear is caused at the respective four bearings, thus causing a large total friction loss.

A second problem is that since the rotation shaft of the smaller gear is rotatably supported at an end portion on the inner circumferential surface of the hollow rotation shaft of the sun gear, there is a difficulty in making smaller the diameter of the sun gear formed on the outer periphery of the hollow shaft and therefore in making smaller the size of the planetary reduction gear unit.

In this instance, the planetary reduction gear unit is naturally restricted in the outer diameter of a ring gear due to the requirement for its mounting on a vehicle (e.g., layout of a vehicle) and the weight requirement. Due to this, when the diameter of the sun gear is large, it is difficult to make smaller the value a (the number of teeth of the sun gear/the number of teeth of the ring gear), thus making it difficult to attain a large reduction ratio.

Accordingly, since the reduction ratio "r" is small, the above described prior art power train system requires the motor to produce a large torque, thus requiring such a motor that is large-sized, heavy and expensive.

In brief, the above two problems are caused by the prior art structure wherein an end of the rotation shaft of the smaller gear is supported indirectly upon the casing, i.e., by way of the hollow rotation shaft of the sun gear in addition to a bearing means.

It is accordingly an object of the present invention to provide a novel and improved power train system for a vehicle which can reduce the number of bearings necessary for supporting a load perpendicularly to an axis of rotation of a smaller gear of a parallel reduction gear unit and can make a planetary reduction gear unit compact in size.

To achieve the above object, there is provided according to the present invention a novel and improved power train system for a vehicle having a motor and a differential gear unit. The power train system comprises a stationary casing, a planetary reduction gear unit disposed within the casing and having a sun gear disposed coaxially with and connected to an output shaft of the motor so as to be driven thereby, a ring gear fixedly attached to the casing, at least one pinion gear disposed between the sun gear and the ring gear and a carrier carrying thereon the pinion gear and having an output portion, and a parallel reduction gear unit disposed within the casing and having a smaller gear and larger gear meshing with each other. The smaller gear has a rotation shaft connected coaxially with the output portion of the carrier. The larger gear is disposed coaxially with an output portion of the differential gear unit which is disposed so that the output shaft of the motor and an axis of rotation of the output portion of the differential gear unit are parallely offset in the longitudinal direction of the vehicle. Opposite ends of the rotation shaft of the smaller gear are supported rotatably and directly upon the casing.

DETAILED DESCRIPTION OF THE PREFERRED EMBODIMENTS

Figure 1:
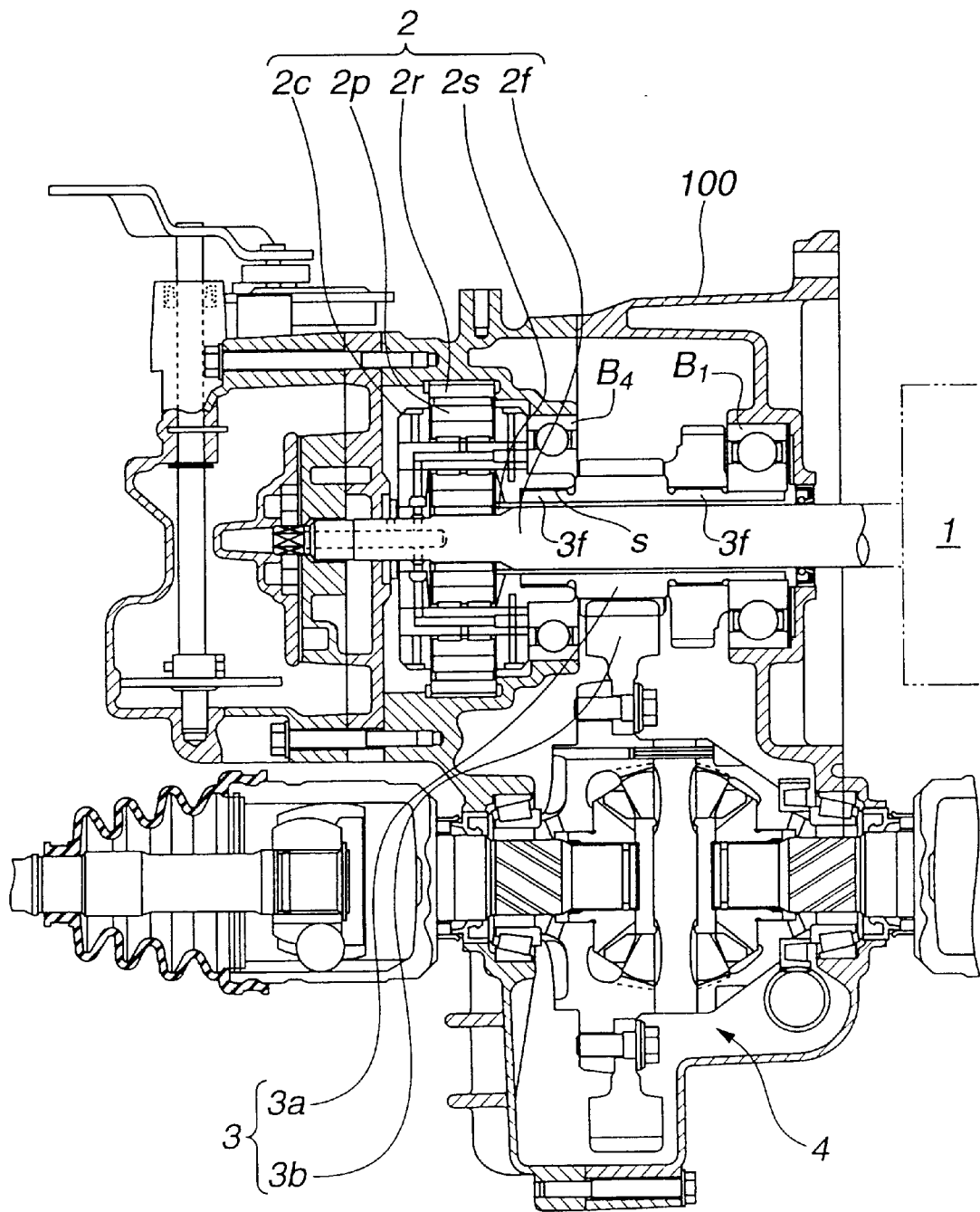
FIG. 1 is a sectional view of a power train system for an electric vehicle according to an embodiment of the present invention.
Figure 2:
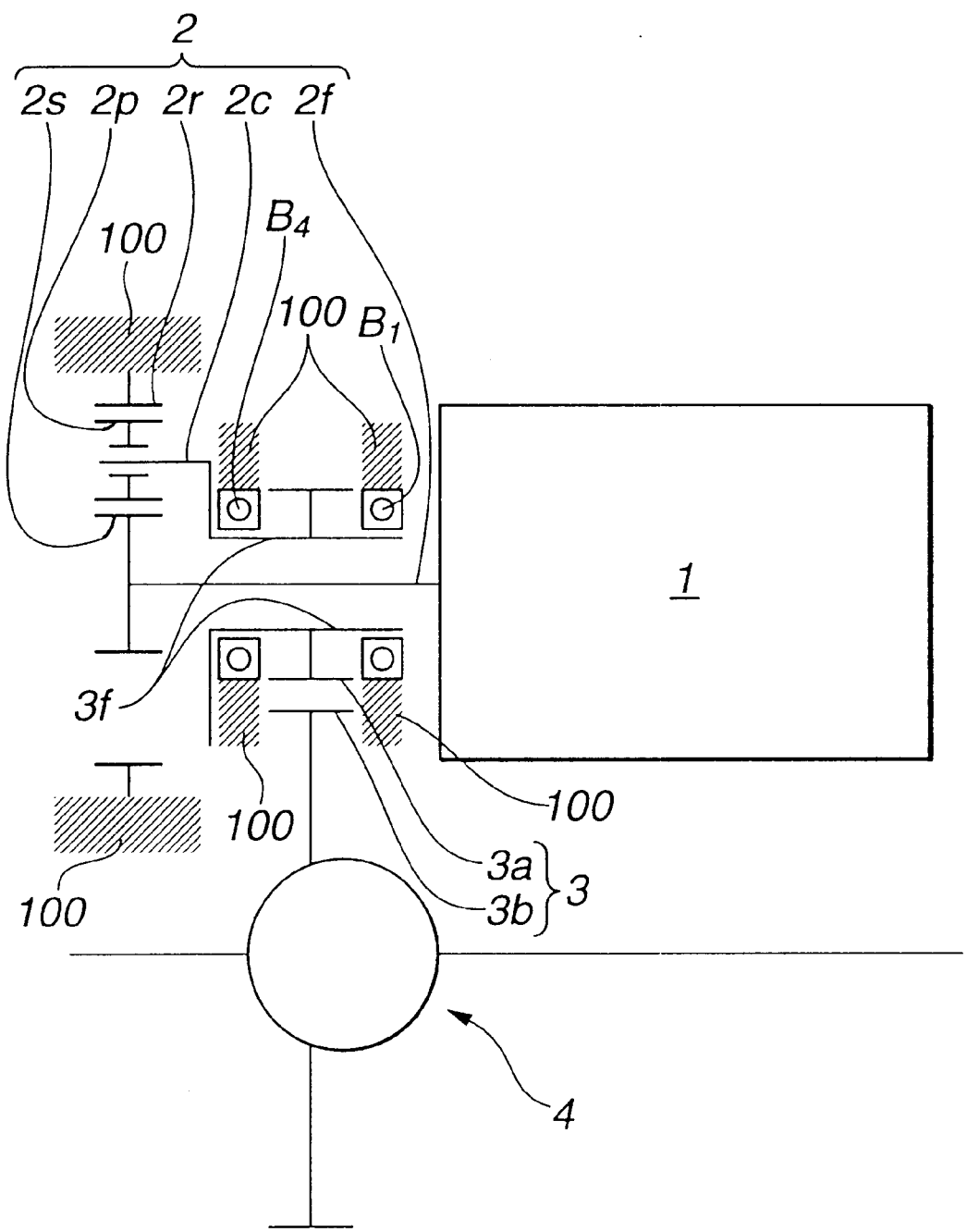
FIG. 2 is a diagrammatic view of the power train system of FIG. 1.

Referring first to FIGS. 1 and 2, an electric motor 1 is provided to serve as a power source. A power train system for an electric vehicle according to an embodiment of the present invention includes a casing 100. Disposed within the casing 100 are a planetary reduction gear unit 2, a parallel reduction gear unit 3 and a differential gear unit 4. The planetary reduction gear unit 2 includes a rotation shaft 2f of a sun gear 2s and connected by way of the rotation shaft 2f to an output shaft (no numeral) of the motor 1. The parallel reduction gear unit 3 includes a smaller gear 3a and larger gear 3b meshing with each other. The smaller gear 3a is disposed coaxially with the planetary reduction gear unit 2, i.e., the smaller gear 3a and the planetary reduction gear unit 2 have a common axis (first axis). The differential gear unit 4 is disposed so that the output shaft of the motor 1 and an axis of rotation of an output portion (no numeral) of the differential gear unit 4 (i.e., second axis) are offset in the longitudinal direction of the vehicle. In this connection, the output portion of the differential gear unit 4 includes side gears (no numeral) for connection to drive axles (no numeral) of the vehicle.

The planetary reduction gear unit 2 includes a sun gear 2s mounted on the rotation shaft 2f and a carrier 2c connected to the smaller gear 3a so as to turn or rotate as an integral unit. The sun gear 2s serves as an input member and the carrier 2c serves as an output member of the planetary reduction gear unit 2. The carrier 2c rotatably supports thereon one or more pinion gears 2p and is in turn rotatably supported by way of a bearing B4 on the casing 100.

The planetary reduction gear unit 2 provides a first reduction gear ratio r1. Rotation of the motor 1 supplied to the sun gear 2s causes the pinion gears 2p to move around along the inner periphery of the ring gear 2r fixedly attached to the casing 100 and is thereby supplied to the carrier 2c.

The parallel reduction gear unit 3 provides a second reduction gear ratio r2. The smaller gear 3a has an integral, hollow rotation shaft 3f connected to an output portion (no numeral) of the carrier 2c. By allowing the rotation shaft 2f of the sun gear 2s to extend through the hollow rotation shaft 3f, the smaller gear 3a is disposed between the motor 1 and the planetary reduction gear unit 2.

One of the opposite end portions of the hollow rotation shaft 3f is rotatably supported on the casing 100 by means of a bearing B1, and the other end portion of the hollow rotation shaft 3f is splined to the carrier 2c. Splines for connection between the rotation shaft 3f and the carrier 2c are indicated by s in FIG. 1. The larger gear 3b rotatably meshed with the smaller gear 3a is bolted to an outer peripheral portion of the differential gear unit 4.

Then operation of this embodiment will now be described.

The power from the motor 1 is transmitted to the planetary reduction gear unit 2 and thereby reduced in speed with the first reduction ratio r1. Thereafter, the power is transmitted to the smaller gear 3a of the parallel reduction gear unit 3, which is disposed in front of the planetary reduction gear unit 2, i.e., disposed between the planetary reduction gear unit 2 and the motor 1, and then supplied to the differential gear unit 4 disposed so that the output shaft of the motor 1 and the axis of rotation of the output portion of the differential gear unit 4 are offset in the longitudinal direction of the vehicle, after being reduced in speed with the second reduction ratio r2.

Accordingly, with the power train system of this invention, the power of the motor 1 present at the aforementioned first axis is reduced in speed with the first reduction ratio r1 by means of the planetary reduction gear unit 2 and thereafter reduced in speed with the second reduction ratio r2 by means of the parallel reduction gear unit 3, whereby the power of the motor 1 is supplied from the first axis to the differential gear unit 4 disposed on the aforementioned second axis after being reduced in speed. The reduction ratio r of the entire system is obtained by the following expression.

$$r = (\text{reduction ratio } r1) \times (\text{reduction ratio } r2)$$

In this embodiment, it is unnecessary for the smaller gear 3a to be supported rotatably upon an inner portion of the planetary reduction gear unit 2 as in the above described prior art system wherein the rotation shaft of the smaller gear of the parallel reduction gear unit is extended into the hollow rotation shaft of the sun gear to be supported rotatably thereon.

Namely, since the planetary reduction gear unit 2 does not produce any force perpendicular to the axial direction thereof, it will do to support only the smaller gear 3a of the parallel reduction gear unit 3 upon the casing 100. Thus, it becomes possible to reduce the number of bearings necessitated. Further, the sun gear 2s can be reduced in diameter without changing the size of the planetary reduction gear unit 2, the design freedom of the reduction ratio r1 becomes larger and therefore a larger reduction ratio can be obtained.

Thus, according to the present invention, the manufacturing cost can be reduced by the amount corresponding to the reduced number of bearings. Furthermore, a friction loss caused at the bearings due to a load perpendicular to the axial direction can be made smaller.

Further, according to the present invention, a larger reduction ratio can be attained without making larger the size of the planetary reduction gear unit 2, so a maximum electric motor torque necessitated at the time of production of the same maximum driving force as the conventional can be made smaller. Thus, the motor 1 utilized can be smaller in size and in addition lower in cost.

Particularly, in this embodiment, by supporting the opposite ends of the smaller gear 3a of the parallel reduction gear unit 3 directly upon the casing 100 by way of the bearings B1 and B4, the number of bearings which is necessitated for this end and which is four in the above described prior art system can be reduced to two, thus making it possible to attain the above described effect with efficiency.

In the foregoing, it is to be noted that while the bearing B4 is mounted on the output portion (no numeral) of the carrier 2c to support the output portion rotatably upon the casing 100, an end of the rotation shaft 3f of the smaller gear 3a is splined to the output portion of the carrier 2c by means of the splines indicated by s in FIG. 1 and is therefore rotationally fixed to or integral with the output portion. Accordingly, the end of the rotation shaft 3f, which is splined to the output portion of the carrier 2c, can be regarded as being supported rotatably and directly upon the casing 100.

Figure 3:
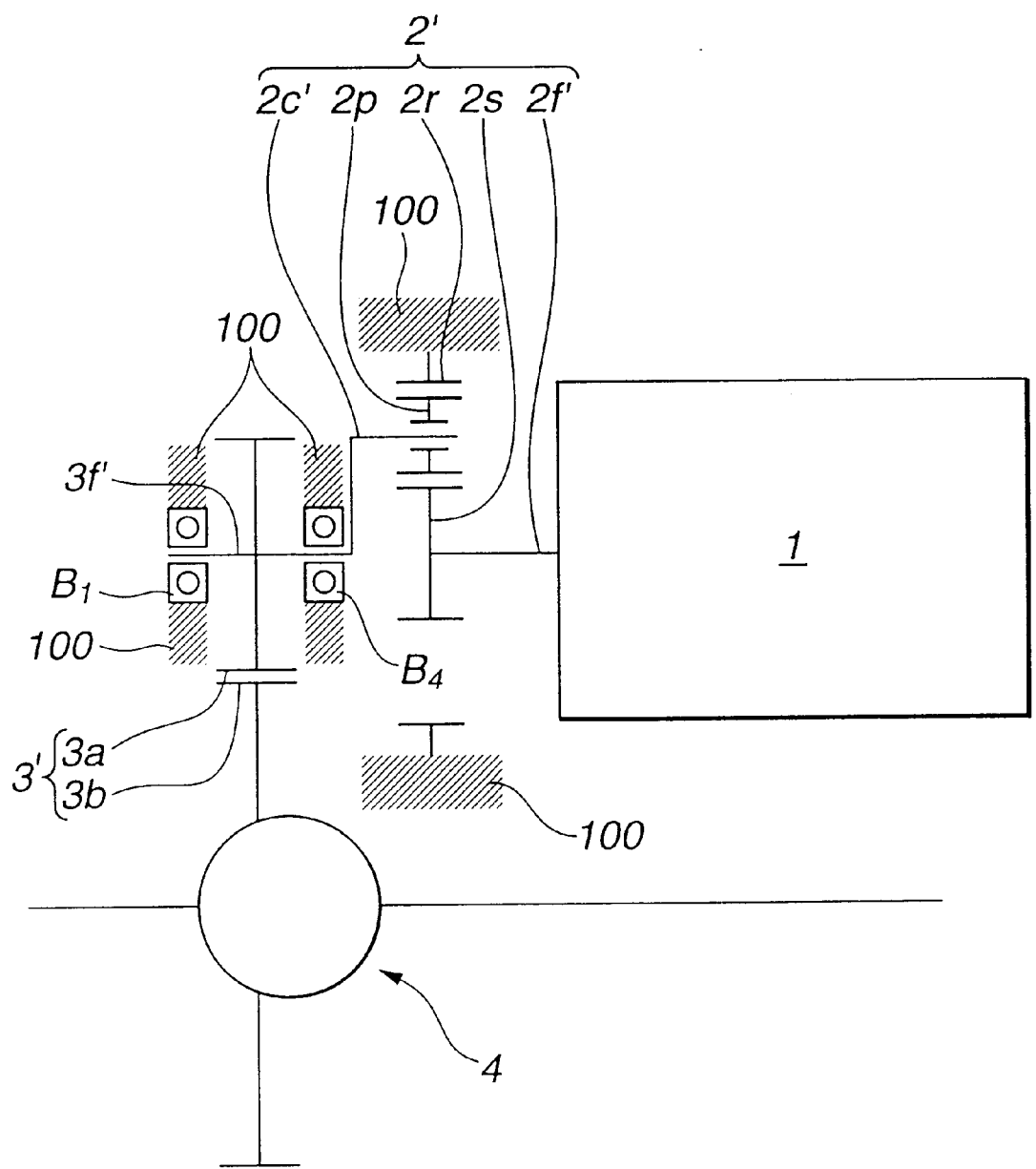
FIG. 3 is a view similar to FIG. 2 but shows another embodiment.

Referring to FIG. 3, another embodiment will be described. In FIG. 3, like parts and portions to those of the embodiment described with reference to FIGS. 1 and 2 will be designated by like reference characters.

This embodiment differs from the first embodiment in that the planetary reduction gear unit 2' is disposed between the motor 1 and the parallel reduction gear unit 3'. In contrast to this, in the first embodiment, the planetary reduction gear unit 2 is disposed on the side of the parallel reduction gear unit 3 opposite to the motor 1.

In this embodiment, the rotation shaft 3f' is not required to be hollow for allowing the shaft 2f to pass therethrough but can be solid and supported at the opposite ends thereof by means of the bearings B1 and B4. The carrier 2c' is splined to an end of the rotation shaft 3f'.

Except for the above, this embodiment is substantially similar to the first embodiment and can produce substantially the same effect.

In the meantime, it is desirable to dispose the differential gear unit 4 at a laterally central portion of a vehicle body so that the left and right drive axles of the vehicle can be as equal in length as possible. In this connection, a smaller distance between a motor such as a motor and/or an engine which is a heavy equipment of a vehicle and the differential gear unit, makes it possible to dispose the motor at a position closer to the laterally central portion of the vehicle body. The first embodiment described with reference to FIGS. 1 and 2 is thus preferable in this respect, i.e., preferable from the point of view with respect to the disposition of the differential gear unit and the motor.

The entire contents of Japanese Patent Application P11176657 (filed Jun. 23, 1999) is incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, the power train system of this invention can be applied to a vehicle other than an electric vehicle and therefore the motor 1 is not limited to an electric motor but can be an engine. The scope of the invention is defined with reference to the following claims.

What is claimed is:

1. A power train system for a vehicle having a motor and a differential gear unit, comprising:

a stationary casing;

a planetary reduction gear unit disposed within said casing and having a sun gear disposed coaxially with and connected to an output shaft of the motor so as to be driven thereby, a ring gear fixedly attached to said casing, at least one pinion gear disposed between said sun gear and said ring gear and a carrier carrying thereon said pinion gear and having an output portion;

a parallel reduction gear unit disposed within said casing and having a smaller gear and larger gear meshing with each other, said smaller gear having a rotation shaft coaxially connected to said output portion of said carrier, said larger gear being disposed coaxially with an output portion of the differential gear unit which is disposed so that the output shaft of the motor and an axis of rotation of the output portion of the differential gear unit are parallely offset in the longitudinal direction of the vehicle; and a pair of bearings mounted on opposite ends of said rotation shaft of said smaller gear for supporting said opposite ends of said rotation shaft of said smaller gear rotatably and directly upon said casing.

2. The power train system according to claim 1, wherein said rotation shaft of said smaller gear is hollow to allow the output shaft of the motor to extend therethrough to have a protruded end connected to said sun gear such that said smaller gear is disposed between said sun gear and the motor.

3. The power train system according to claim 1, wherein said sun gear is directly connected to the output shaft of the motor and disposed between said smaller gear and the motor.

4. A power train system for a vehicle having a motor and a differential gear unit, the motor and the differential gear unit being disposed so that an output shaft of the motor and an axis of rotation of an output portion of the differential gear unit are parallely offset in the longitudinal direction of the vehicle, the power train system connecting between the motor and the differential gear unit, comprising:

a stationary casing;

a planetary reduction gear unit disposed within said casing and having a sun gear disposed coaxially with and connected to the output shaft of the motor so as to be driven thereby, a ring gear fixedly attached to said casing, at least one pinion gear disposed between said sun gear and said ring gear and a carrier carrying thereon said pinion gear and having an output portion;

a parallel reduction gear unit disposed within said casing and having a pair of meshing smaller gear and larger gear, said smaller gear having a rotation shaft connected coaxially with said output portion of said carrier, said larger gear being disposed coaxially with the output portion of the differential gear unit; and bearing means for supporting opposite ends of said rotation shaft of said smaller gear rotatably and directly upon said casing, wherein said bearing means comprises a pair of bearings mounted on said opposite ends of said rotation shaft of said smaller gear, respectively.

5. The power train system according to claim 4, wherein said rotation shaft of said smaller gear is hollow to allow the output shaft of the motor to extend therethrough to have a protruded end connected to said sun gear such that said smaller gear is disposed between said sun gear and the motor.

6. The power train system according to claim 4, wherein said sun gear is directly connected to the output shaft of the motor and disposed between said smaller gear and the motor.

7. A power train system for a vehicle comprising:

a motor having an output shaft;

a differential gear unit having an output portion;

said motor and said differential gear unit being disposed so that said output shaft of said motor and an axis of rotation of said output portion of said differential gear unit are parallely offset in the longitudinal direction of the vehicle;

a planetary reduction gear unit and a parallel reduction gear unit disposed between said motor and said differential gear unit; and a stationary casing receiving therewithin said differential gear unit, said planetary reduction gear unit and said parallel reduction gear unit;

said planetary reduction gear unit comprising a sun gear disposed coaxially with and connected to said output shaft of said motor so as to be driven thereby, a ring gear fixedly attached to said casing, at least one pinion gear disposed between said sun gear and said ring gear, and a carrier carrying thereon said pinion gear and having an output portion;

said parallel reduction gear unit comprising a pair of meshing smaller gear and larger gear, said smaller gear having a rotation shaft coaxially connected to said output portion of said carrier, said larger gear being disposed coaxially with said output portion of said differential gear unit;

said parallel reduction gear unit further comprising bearing means for supporting opposite ends of said rotation shaft of said smaller gear rotatably and directly upon said casing; and said bearing means comprising a pair of bearings mounted on said opposite ends of said rotation shaft of said smaller gear, respectively.

8. A The power train system according to claim 7, wherein said rotation shaft of said smaller gear is hollow to allow said output shaft of said motor to extend therethrough to have a protruded end connected to said sun gear such that said smaller gear is disposed between said sun gear and said motor.

9. The power train system according to claim 7, wherein said sun gear is directly connected to said output shaft of said motor and disposed between said smaller gear and said motor.

* * * * *